US008498540B2

(12) United States Patent
Kim et al.

(10) Patent No.: US 8,498,540 B2
(45) Date of Patent: Jul. 30, 2013

(54) SYSTEM AND METHOD FOR ACQUIRING DATA OF MULTI-CHANNEL SIGNAL

(75) Inventors: Jin Mok Kim, Daejeon (KR); Yong Ho Lee, Daejeon (KR); Hyuk Chan Kwon, Daejeon (KR); Ki Woong Kim, Daejeon (KR)

(73) Assignee: Korean Research Institute of Standards and Science, Yuseong-Gu, Daejeon (KR)

( * ) Notice: Subject to any disclaimer, the term of this patent is extended or adjusted under 35 U.S.C. 154(b) by 159 days.

(21) Appl. No.: 13/204,537

(22) Filed: Aug. 5, 2011

(65) Prior Publication Data

US 2011/0293291 A1 Dec. 1, 2011

Related U.S. Application Data

(63) Continuation of application No. PCT/KR2009/006422, filed on Nov. 3, 2009.

(30) Foreign Application Priority Data

Apr. 22, 2009 (KR) ........................ 10-2009-0035115

(51) Int. Cl.
*H04B 10/00* (2013.01)
(52) U.S. Cl.
USPC .......................................... 398/115; 398/110
(58) Field of Classification Search
USPC ........................... 398/110, 115–117; 250/551
See application file for complete search history.

(56) References Cited

U.S. PATENT DOCUMENTS

| 4,907,597 | A | 3/1990 | Chamoun |
| 5,333,088 | A * | 7/1994 | Sweet ........................... 398/110 |
| 2006/0173364 | A1 | 8/2006 | Clancy et al. |
| 2008/0046627 | A1 | 2/2008 | Castro et al. |
| 2008/0312523 | A1 * | 12/2008 | Dunseath ...................... 600/383 |
| 2009/0093705 | A1 * | 4/2009 | Vangdal ........................ 600/410 |

FOREIGN PATENT DOCUMENTS

| CN | 101368996 A | 2/2009 |
| FR | 2 552 228 A1 | 3/1985 |
| JP | 10-341433 A | 12/1998 |
| KR | 10-2002-0065063 A | 8/2002 |
| KR | 10-0712594 B1 | 4/2007 |
| KR | 10-2008-0113661 A | 12/2008 |

OTHER PUBLICATIONS

International Search Report in PCT/KR2009/006422, dated May 26, 2010.
Written Opinion in PCT/KR2009/006422, dated May 26, 2010.
Search Report dated Jan. 7, 2013 issued in European counterpart application (No. 09843710.6).

* cited by examiner

*Primary Examiner* — Leslie Pascal
(74) *Attorney, Agent, or Firm* — Womble Carlyle

(57) ABSTRACT

A system for acquiring data of a multi-channel signal includes a channel-voltage transmission module disposed in a shield room blocking electromagnetic waves, connected with a plurality of channels from which analog signals are output, and configured to generate a serial digital signal having information about an analog signal and information about a channel from which the analog signal is output, and an optical fiber cable through which the serial digital signal is transmitted from the channel-voltage transmission module to the outside of the shield room.

15 Claims, 16 Drawing Sheets

SYSTEM AND METHOD FOR ACQUIRING DATA OF MULTI-CHANNEL SIGNAL

CROSS-REFERENCE TO RELATED APPLICATION

This is a Continuation of International Application No. PCT/KR2009/006422, filed Nov. 3, 2009, and published as WO 2010/123182A1 on Oct. 10, 2010. This application claims priority to and the benefit of Korean Patent Application No. 2009-0035115, filed on Apr. 22, 2009. The contents of the above-identified applications are incorporated by reference in their entirety.

BACKGROUND

1. Field of the Invention

The present invention relates to a data acquisition system, and more particularly, to a system and method for acquiring data of a multi-channel signal.

2. Discussion of Related Art

A data acquisition system is a part of a measurement system acquiring and storing data. Engineers read a dial of a transducer to define a value according to the dial and record the information in a record book, which is the same as a task processed by a data acquisition system. For a task of acquiring, quantizing and storing data, a data acquisition system based on a datalogger collecting and storing a signal and a personal computer (PC) is used.

A voltage signal measured by a precise sensor in a magnetically shielded room (MSR) or radio-frequency shielded room (RFSR) is transmitted to a data acquisition (DAQ) board outside the shield room. The DAQ board is hardware converting a voltage signal output through a sensor or signal conditioning module into a digital signal that can be recognized by a computer. In general, a DAQ board installed in a computer acquires an output voltage signal and transfers it to the inside of the computer. The voltage signal transferred to the computer is stored in a storage, or analyzed and displayed on a monitor.

FIG. 1 illustrates a system for acquiring data of a multi-channel signal using a DAQ board.

Referring to FIG. 1, a system 10 for acquiring data of a multi-channel signal measures output signals of 256 channels to acquire data, and includes 256 wires 21, a ground wire 25, a plurality of DAQ boards 31 to 34, and a computer 35.

A voltage signal that is measured by a sensor in a shield room 40 is output from the shield room 40 through the 256 wires 21 and the ground wire 25, and input to the plurality of DAQ boards 31 to 34. When one DAQ board can have 64 channels, four DAQ boards are installed to receive a voltage signal output from the 256 channels.

The plurality of DAQ boards 31 to 34 convert an input voltage signal into a digital signal and send the digital signal to the computer 35. When there are a large number of DAQ boards, the DAQ boards are installed in a versa module Eurocard (VME) extensions for instrumentation (VXI) device rather than directly in the computer 35, and an output of the VXI device is sent to the computer 35.

FIG. 2 illustrates a system for acquiring data of a multi-channel signal using a channel module.

Referring to FIG. 2, a system 50 for acquiring data of a multi-channel signal measures an output signal of 16 channels to acquire data, and includes 16 wires 61, a ground wire 65, an analog switch 71, an analog-to-digital converter (ADC) 72, a clock/counter 73, a digital signal processor (DSP) 74, and a computer 80.

Voltage signals measured by a sensor in a shield room 90 are output from the shield room 90 through the 16 wires 61 and the ground wire 65, and input to the analog switch 71. The analog switch 71 selects an input signal and sends the selected signal to the ADC 72.

The ADC 72 converts the selected input voltage signal into a digital signal and sends the digital signal to the DSP 74. The clock/counter 73 sends an input channel selection signal for selecting an input channel to the analog switch 71, or sends a signal to the ADC 72 and the DSP 74 to connect them and synchronize the ADC 72 with the input channel. The DSP 74 processes the input digital signal and sends the processed digital signal to the computer 80.

To acquire data from 32 channels, a 32:1 analog switch and one ADC are used, or two 16:1 analog switches and two ADCs are connected in parallel. To acquire data from 256 channels, sixteen 16-channel modules or eight 32-channel modules are used.

In a system for acquiring data of a multi-channel signal using a DAQ board, the number of wires coming from a shield room increases in proportion to the number of channels, thereby bringing noise outside the shield room into the shield room. Direct connection between a ground wire of the shield room and a ground wire of the DAQ board also brings additional noise into the shield room. Further, loop-circuit noise is generated between the DAQ board and another DAQ board added to increase signal acquisition channels, and the additional DAQ board results in an increase in cost and a decrease in channel-specific sampling time.

To have 256 channels in a system for acquiring data of a multi-channel signal using a channel module, many modules and a VXI device installed with a module board are required. These make the system complicated and increase cost.

SUMMARY OF THE INVENTION

The present invention is directed to providing a system for acquiring data of a multi-channel signal which transmits a multi-channel signal measured in a shield room to the outside of the shield room at high speed without external noise, and allows a computer to easily obtain the multi-channel signal transmitted to the outside.

One aspect of the present invention provides a system for acquiring data of a multi-channel signal including: a channel-voltage transmission module disposed in a shield room blocking electromagnetic waves, connected with a plurality of channels from which analog signals are output, and configured to generate a serial digital signal having information about an analog signal and information about a channel from which the analog signal is output; and an optical fiber cable through which the serial digital signal is transmitted from the channel-voltage transmission module to the outside of the shield room.

Another aspect of the present invention provides a system for acquiring data of a multi-channel signal including: a channel-voltage transmission module unit disposed in a shield room blocking electromagnetic waves, connected with a plurality of channels from which an analog signal is output, and including a plurality of channel-voltage transmission modules generating a serial digital signal having information about the analog signal and information about a channel from which the analog signal is output; and optical fiber cables through which the serial digital signal is transmitted from the channel-voltage transmission module unit to the outside of the shield room, and having the same number as the channel-voltage transmission modules.

Still another aspect of the present invention provides a method of acquiring data of a multi-channel signal including: generating, from an analog signal output from a plurality of channels, a serial digital signal having information about the analog signal and information about a channel from which the analog signal is output in a shield room blocking electromagnetic waves; and transmitting the serial digital signal to the outside of the shield room using an optical fiber cable.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. Like numbers refer to like elements or corresponding elements, and the description of the same element will be not reiterated.

Exemplary embodiments of the present invention will be described using a voltage value as analog signal information output from a channel of a measurement device, but various types of analog signal information including a current value as well as a voltage value can be used.

Figure 1:
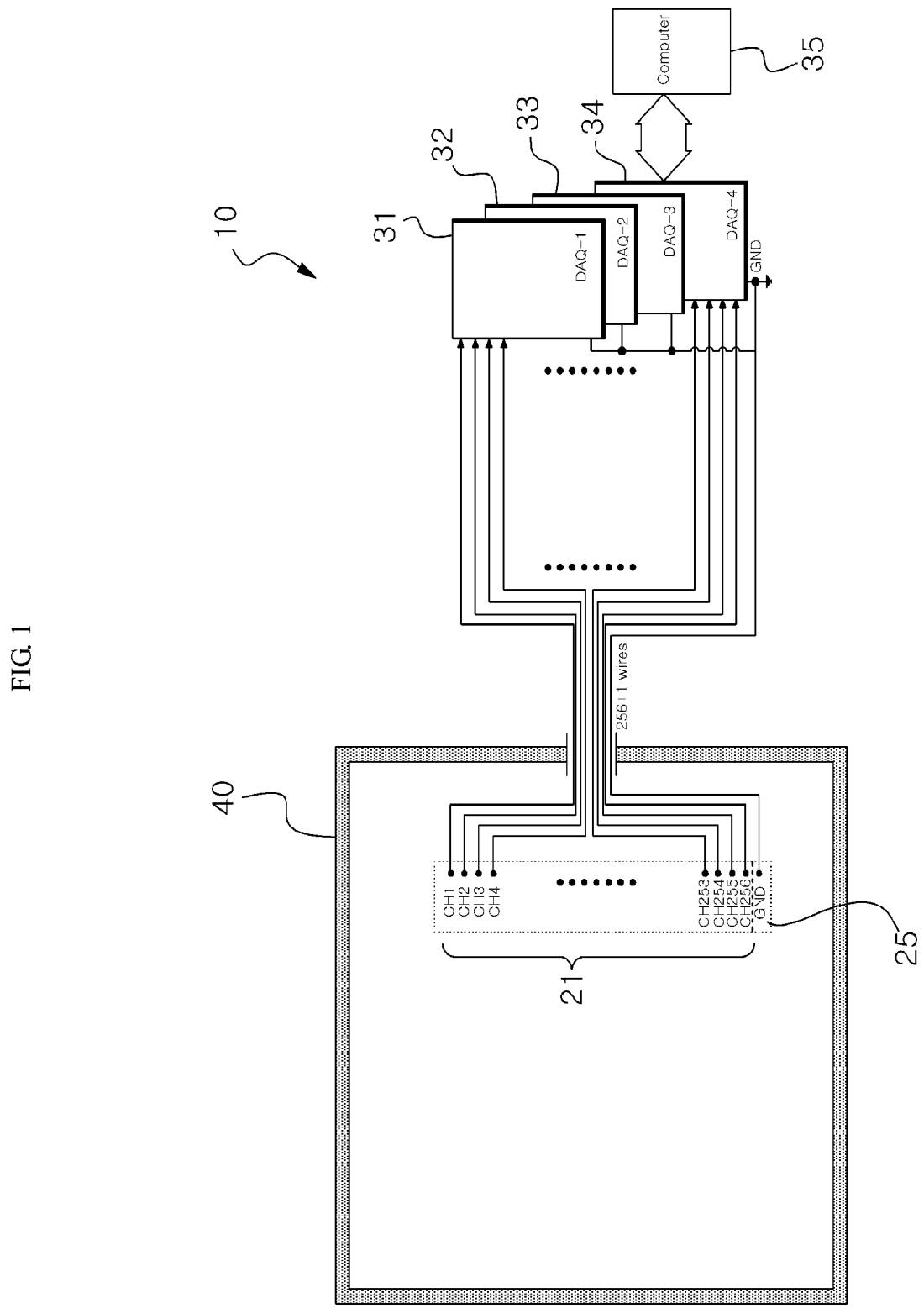
FIG. 1 illustrates a system for acquiring data of a multi-channel signal using a data acquisition (DAQ) board.
Figure 2:
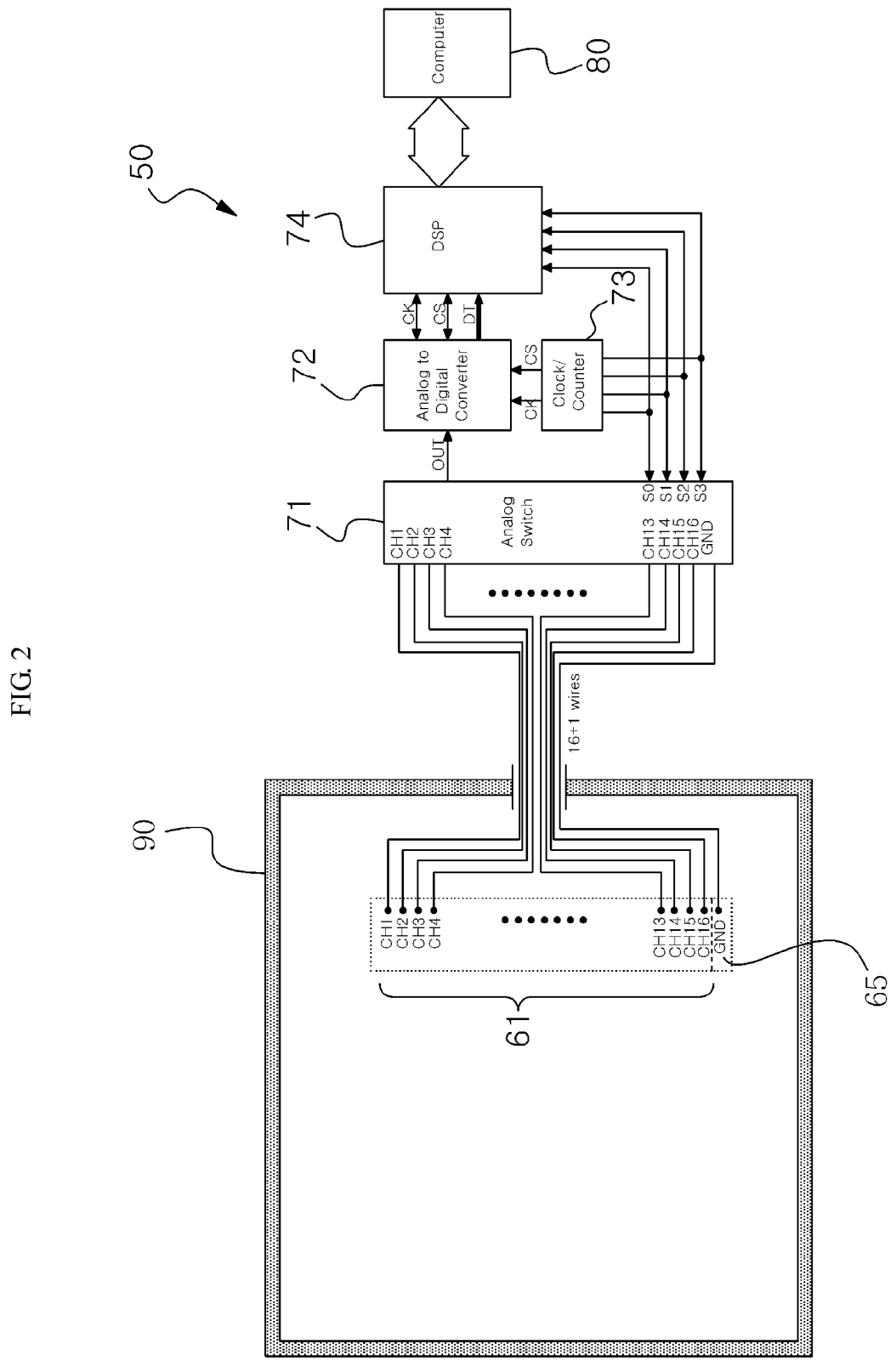
FIG. 2 illustrates a system for acquiring data of a multi-channel signal using a channel module.
Figure 3:
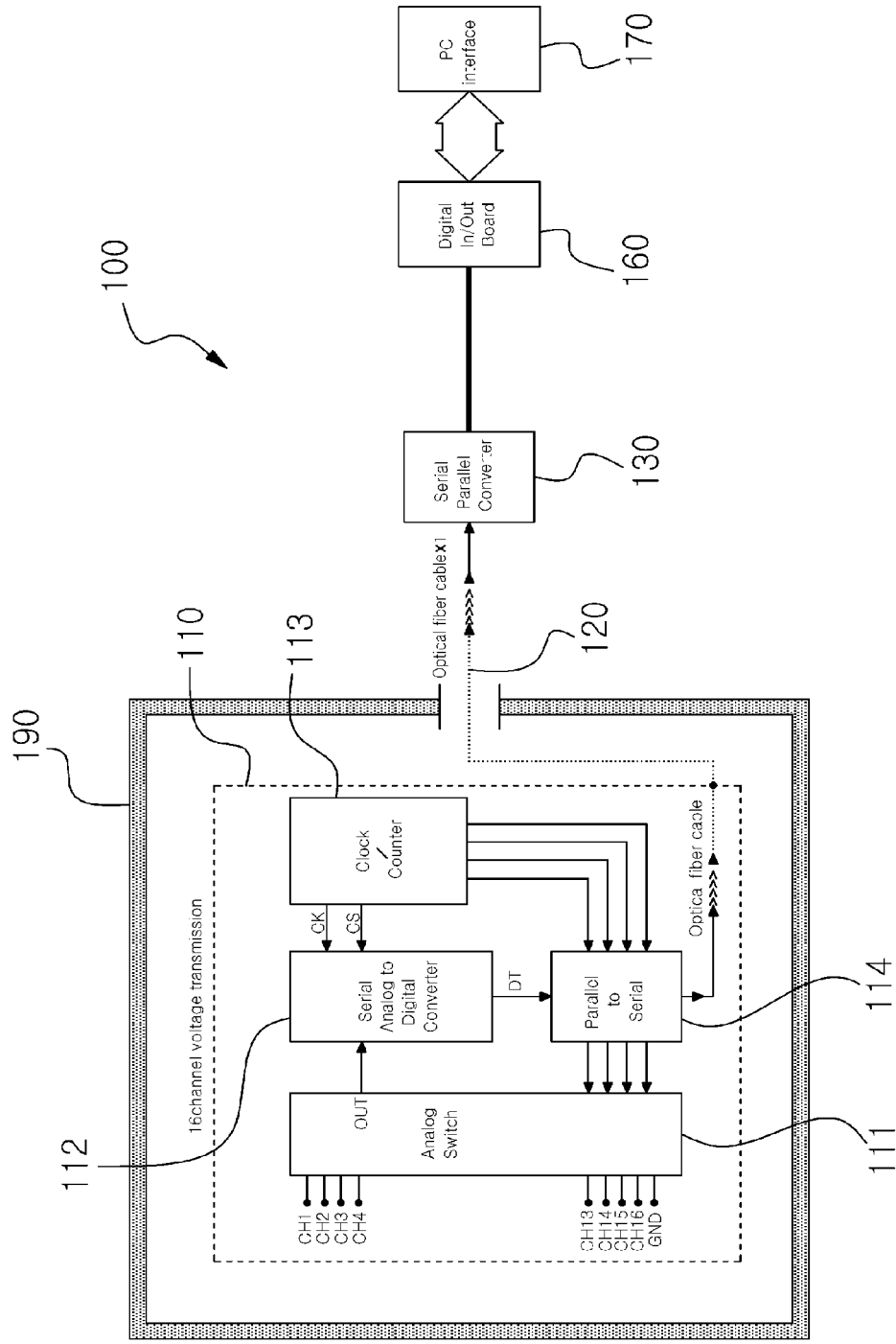
FIG. 3 is a block diagram of a system for acquiring data of 16 channel signals according to an exemplary embodiment of the present invention.

FIG. 3 is a block diagram of a system for acquiring data of 16 channel signals according to an exemplary embodiment of the present invention.

Referring to FIG. 3, a system 100 for acquiring data of 16 channel signals according to an exemplary embodiment of the present invention includes a channel-voltage transmission module 110, an optical fiber cable 120, a serial-to-parallel conversion module 130, a digital input/output (DIO) board 160, and a data storage module 170.

As shown in the drawing, the channel-voltage transmission module 110 may be disposed in a shield room 190 or the channel-voltage transmission module 110 may be disposed without the shield room 190. Here, the shield room 190 may be a magnetically shielded room (MSR) or radio-frequency shielded room (RFSR).

The channel-voltage transmission module 110 converts a voltage signal measured in the shield room 190 and output from 16 channels into a serial digital signal having channel and voltage information. The channel-voltage transmission module 110 includes a 16:1 analog switch 111, an analog-to-digital converter (ADC) 112, a clock/counter 113, and a parallel-to-serial converter 114. From now on, a serial digital signal having channel and voltage information will be referred to as a "channel-voltage serial digital signal."

The 16:1 analog switch 111 sequentially switches to the 16 channels, and operates according to a 4-bit channel selection digital signal generated from the clock/counter 113 to select a voltage signal output from the 16 channels.

The ADC 112 converts the selected voltage signal into a serial digital signal and sends the serial digital signal to the parallel-to-serial converter 114. The clock/counter 113 outputs a 16:1 analog switch operation signal, that is, the channel selection digital signal, to the parallel-to-serial converter 114. The parallel-to-serial converter 114 converts the 16:1 analog switch operation signal into a serial signal, and combines the converted 16:1 analog switch operation signal with the serial digital signal output from the ADC 112 to convert the converted 16:1 analog switch operation signal into a channel-voltage serial digital signal.

Through the optical fiber cable 120, the channel-voltage serial digital signal is transmitted out of the shield room 190 to the serial-to-parallel conversion module 130. The serial-to-parallel conversion module 130 rearranges the channel-voltage serial digital signal, thereby converting it into a channel-voltage parallel digital signal. The DIO board 160 receives and sends the channel-voltage parallel digital signal to the data storage module 170.

The data storage module 170 can have application software for acquiring data. The data storage module 170 receives and stores the channel-voltage digital signal, or outputs the channel and voltage information from the channel-voltage digital signal using the application software.

Figure 4:
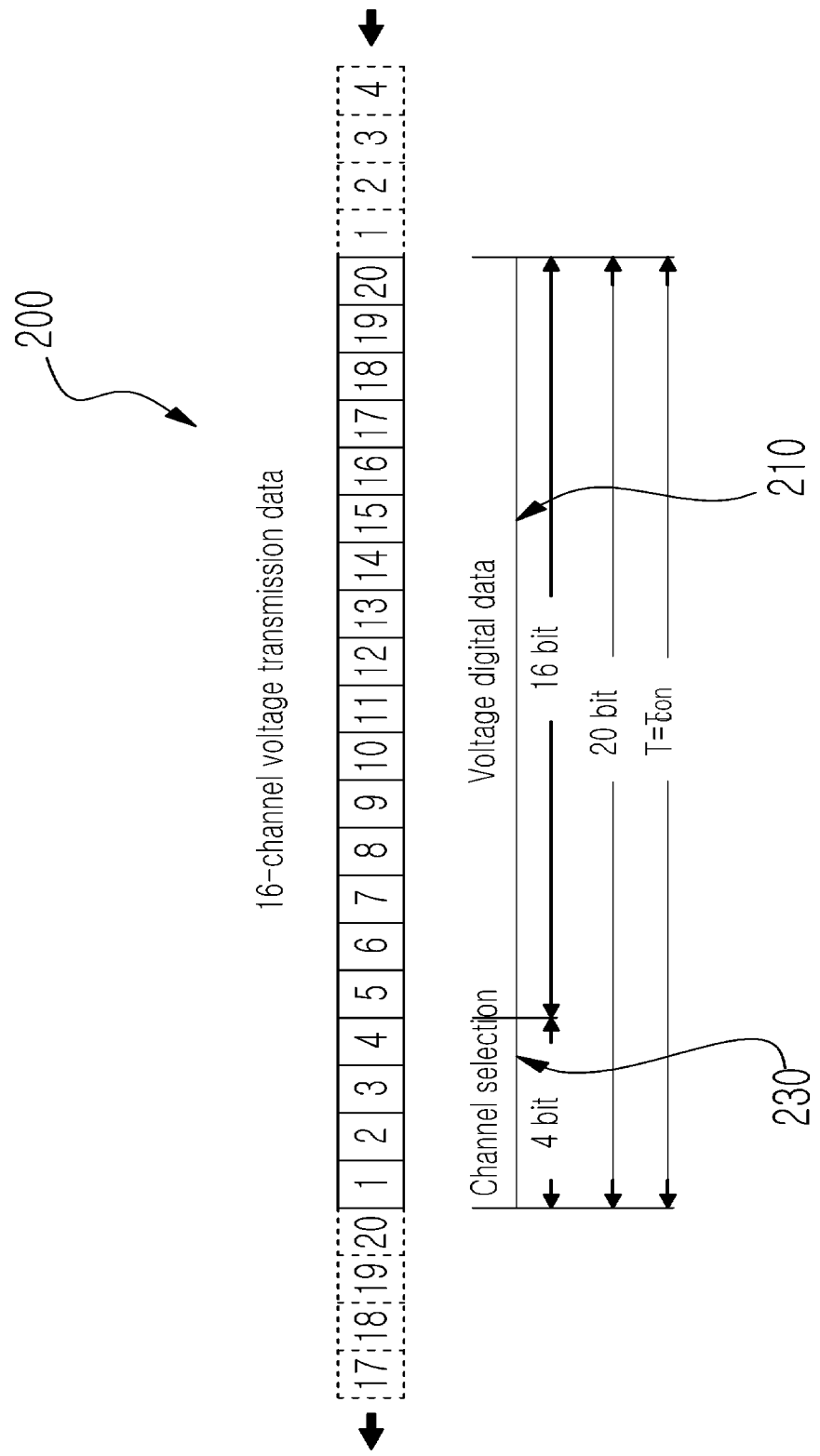
FIG. 4 illustrates a structure of a channel-voltage serial digital signal for one of 16 channels output through an optical fiber cable according to an exemplary embodiment of the present invention.

FIG. 4 illustrates a structure of a channel-voltage serial digital signal for one of 16 channels output through an optical fiber cable according to an exemplary embodiment of the present invention.

Referring to FIGS. 3 and 4, a channel-voltage digital signal 210 output from the ADC 112 has 16 bits, and a channel selection digital signal 230, that is, a 16:1 analog switch operation signal, has 4 bits. The serially-converted 16:1 analog switch operation signal 230 and the serial digital signal 210 output from the ADC 112 are combined by the parallel-to-serial converter 114 and output as a 20-bit channel-voltage serial digital signal 200 corresponding to one of the 16 channels.

A clock/counter time is determined according to a conversion time Tcon of the ADC 112. By lengthening a time in which the 16:1 analog switch 111 switches between channels to be longer than the conversion time of the ADC 112, the ADC 112 can stably convert a voltage signal into a serial digital signal.

An elapsed time of a 20-bit channel-voltage serial digital signal corresponding to one channel is equal to or slightly longer than the conversion time Tcon of the ADC 112, and a period Tck of a clock is as shown in Equation 1 below.

$$Tck = Tcon/20 \quad \text{<Equation 1>}$$

When the output resolution of the ADC 112 is N bits, a channel-voltage serial digital signal has (4+N) bits, and the period Tck of the clock is as shown in Equation 2 below.

$$Tck = Tcon/(4+N) \quad \text{<Equation 2>}$$

When the conversion time of the ADC 112 is Tcon, the channel-voltage transmission module 110 converts the same channel after every 16 Tcon, and thus a sampling time is 1/16 Tcon. When the conversion time Tcon of the ADC 112 is 2 μs, the sampling time is 31.3 kS/s. Even if the output resolution N increases, the same sampling time can be maintained by changing the clock period Tck when the conversion time Tcon of the ADC 112 does not vary. However, when the resolution N increases, Tcon increases, and the sampling time of the ADC 112 decreases.

Figure 5:
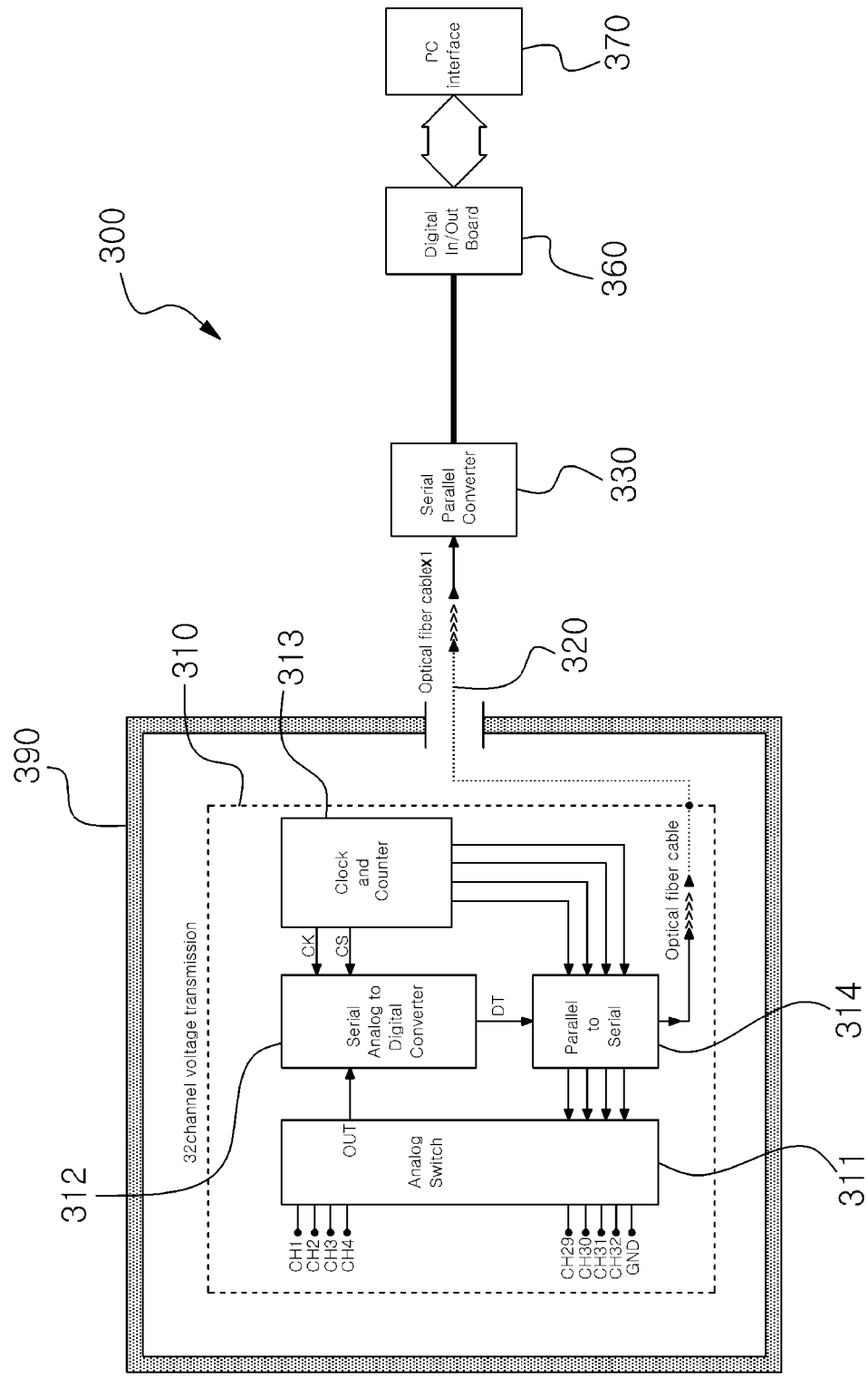
FIG. 5 is a block diagram of a system for acquiring data of 32 channel signals according to an exemplary embodiment of the present invention.

FIG. 5 is a block diagram of a system for acquiring data of 32 channel signals according to an exemplary embodiment of the present invention.

Referring to FIG. 5, a system 300 for acquiring data of 32 channel signals according to an exemplary embodiment of the present invention includes a channel-voltage transmission module 310, an optical fiber cable 320, a serial-to-parallel conversion module 330, a DIO board 360, and a data storage module 370. Functions of the respective components are the same as described with reference to FIG. 3.

The channel-voltage transmission module 310 converts a voltage signal measured in a shield room 390 and output from 32 channels into a channel-voltage serial digital signal, and includes a 32:1 analog switch 311, an ADC 312, a clock/counter 313, and a parallel-to-serial converter 314.

The 32:1 analog switch 311 sequentially switches to the 32 channels, and operates according to a 5-bit channel selection digital signal generated from the clock/counter 313 to select a voltage signal output from the 32 channels.

The ADC 312 converts the selected voltage signal into a serial digital signal and sends the serial digital signal to the parallel-to-serial converter 314. The clock/counter 313 outputs a 32:1 analog switch operation signal to the parallel-to-serial converter 314. The parallel-to-serial converter 314 converts the 32:1 analog switch operation signal into a serial signal, and combines the converted 32:1 analog switch operation signal with the serial digital signal output from the ADC 312 to convert the converted 32:1 analog switch operation signal into a channel-voltage serial digital signal.

The channel-voltage serial digital signal is transmitted to the outside of the shield room 390 through the optical fiber cable 320, output to the data storage module 370 via the serial-to-parallel conversion module 330 and the DIO board 360, and stored in the data storage module 370.

Figure 6:
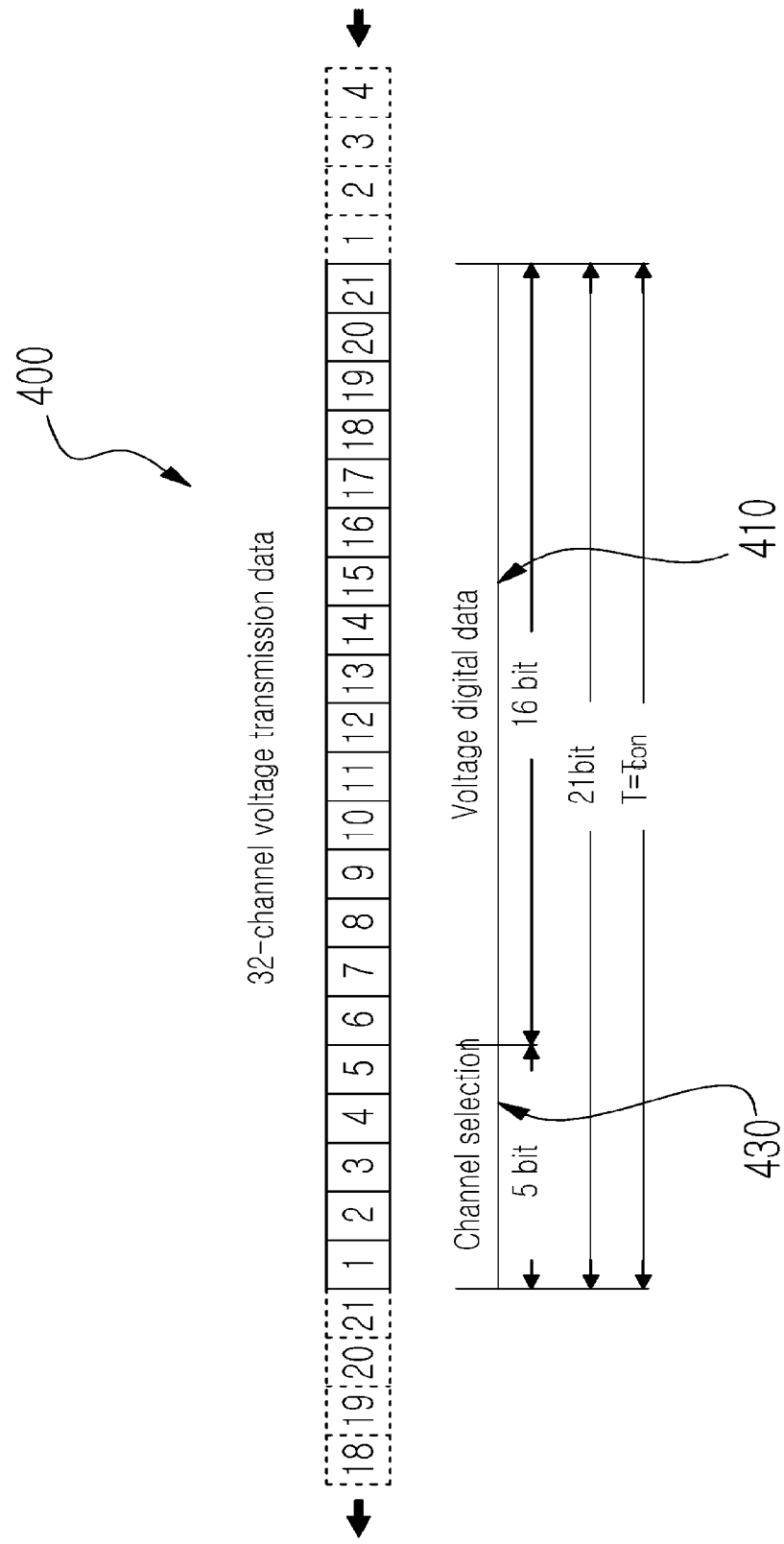
FIG. 6 illustrates a structure of a channel-voltage serial digital signal for one of 32 channels output through an optical fiber cable according to an exemplary embodiment of the present invention.

FIG. 6 illustrates a structure of a channel-voltage serial digital signal for one of 32 channels output through an optical fiber cable according to an exemplary embodiment of the present invention.

Referring to FIGS. 5 and 6, a channel-voltage digital signal 410 output from the ADC 312 has 16 bits, and a channel selection digital signal 430, that is, a 32:1 analog switch operation signal, has 5 bits. The serially-converted 32:1 analog switch operation signal 430 and the channel-voltage digital signal 410 output from the ADC 312 are combined by the parallel-to-serial converter 314 and output as a 21-bit channel-voltage serial digital signal 400 corresponding to one of the 32 channels.

An elapsed time of a 21-bit channel-voltage serial digital signal corresponding to one channel is equal to or slightly longer than a conversion time Tcon of the ADC 312, and a period Tck of a clock is as shown in Equation 3 below.

$$Tck = Tcon/21 \quad \text{<Equation 3>}$$

When the conversion time of the ADC 312 is Tcon, the channel-voltage transmission module 310 converts the same channel after every 32 Tcon, and thus a sampling time is 1/32 Tcon. When Tcon=2 μs, the sampling time is 15.6 kS/s.

Figure 7:
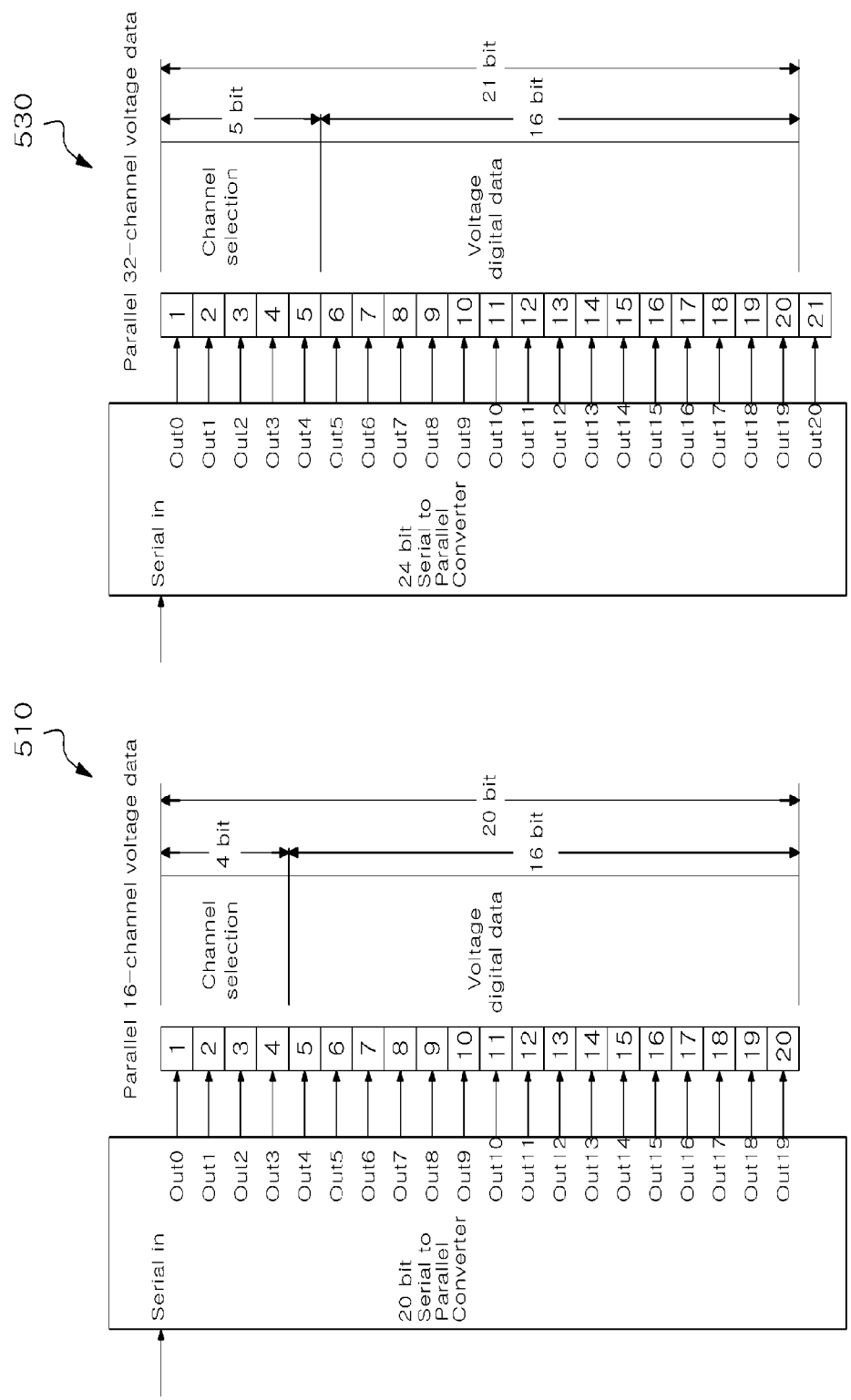
FIG. 7 illustrates a structure of a digital signal output from a serial-to-parallel conversion module according to an exemplary embodiment of the present invention.

FIG. 7 illustrates a structure of a digital signal output from a serial-to-parallel conversion module according to an exemplary embodiment of the present invention.

Referring to FIG. 7, the serial-to-parallel conversion modules 130 and 330 output the signal only after all 20-bit serial digital signal 510 or all 21-bit serial digital signal 530 are input, and hold the signal until all the next 20-bit serial digital signals 510 or all the next 21-bit serial digital signals 530 are input.

When a voltage signal is converted by an N-bit ADC, a channel-voltage serial digital signal is combined with an M-bit channel selection digital signal, and an (M+N) bit serial digital signal is output. The (M+N) bit serial digital signal is input to a serial-to-parallel conversion module, converted into a parallel digital signal, and output.

When there are 16 channels, the number M of bits is 4, and when there are 32 channels, the number M of bits is 5. The channel-voltage parallel digital signal is maintained during the conversion time Tcon of an ADC through which the (M+N) bit serial digital signal will be passed, and then is replaced by a channel-voltage parallel digital signal of the next channel.

A channel-voltage serial digital signal output through an optical fiber cable can be sent to a data storage module through ports of one or two DIO boards without a serial-to-parallel conversion module.

Figure 8:
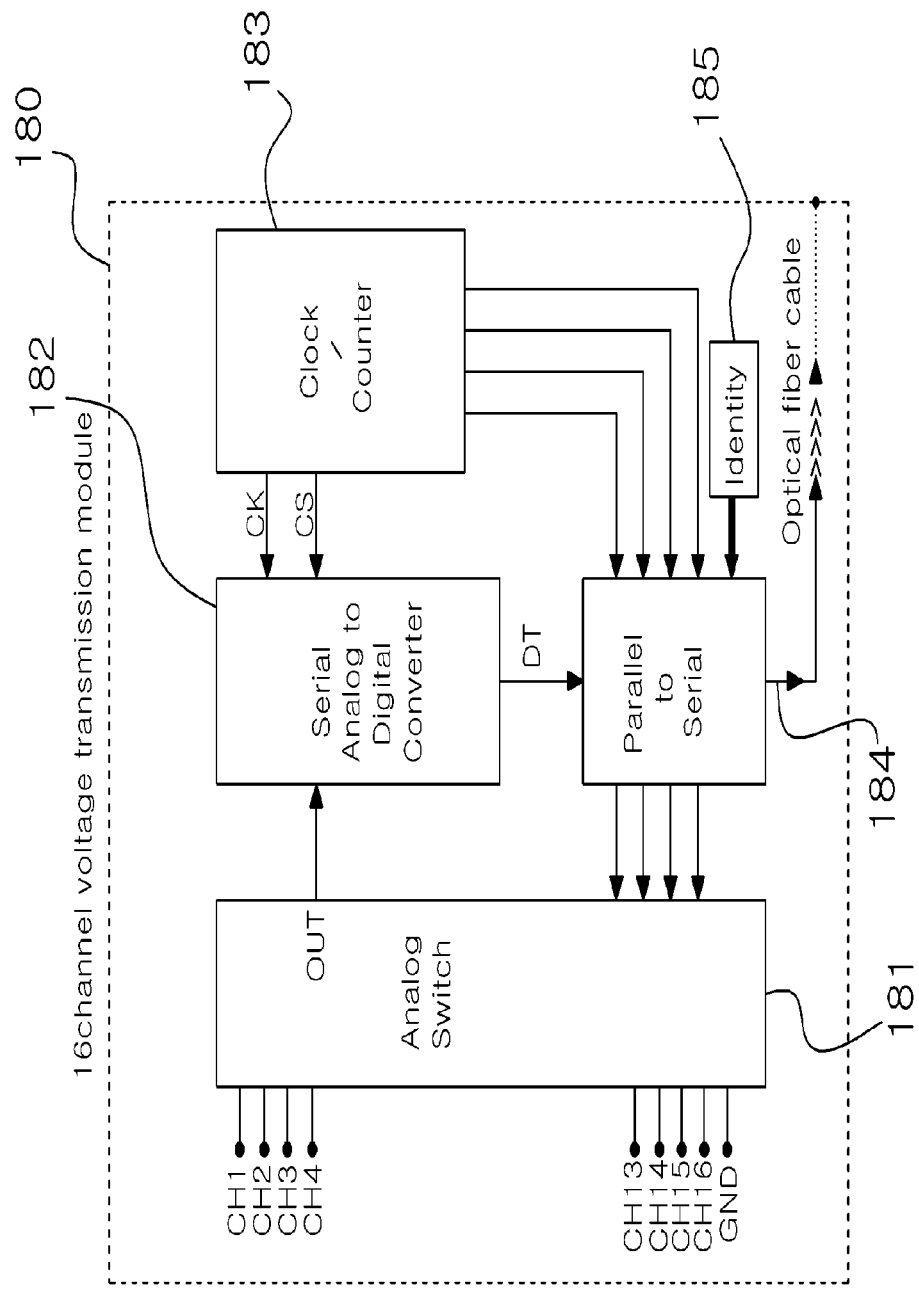
FIG. 8 is a block diagram of a channel-voltage transmission module of a system for acquiring data of 16 channel signals according to an exemplary embodiment of the present invention.

FIG. 8 is a block diagram of a channel-voltage transmission module of a system for acquiring data of 16 channel signals according to an exemplary embodiment of the present invention.

Referring to FIG. 8, a channel-voltage transmission module 180 has the same constitution as the channel-voltage transmission module 110 of FIG. 3 except that a module identifier 185 outputting a digital signal for setting a module is added.

The channel-voltage transmission module 180 sequentially converts voltage signals output from 16 channels into serial digital signals, and includes a 16:1 analog switch 181, an ADC 182, a clock/counter 183, a parallel-to-serial converter 184, and the module identifier 185. The module identifier 185 outputs a 4-bit serial digital signal that is a module signal for identifying a module, and is controlled by an external dual inline package (DIP) switch to distinguish a module from other modules.

The channel-voltage transmission module 180 of the system for acquiring data of 32 channel signals can output a 3-bit serial digital signal that is a module signal for identifying a module.

Figure 9:
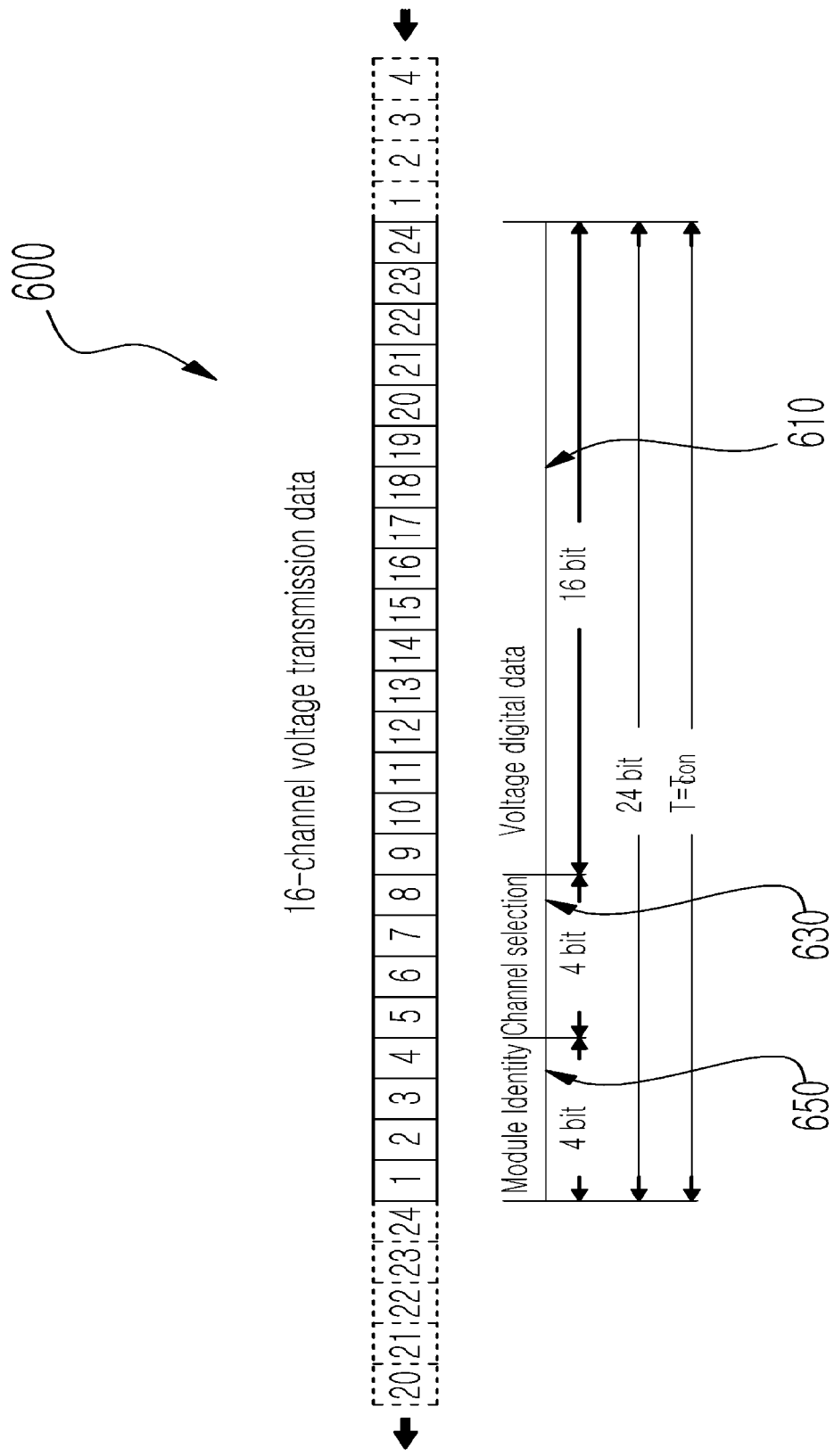
FIG. 9 illustrates a structure of a channel-voltage serial digital signal having a module signal according to an exemplary embodiment of the present invention.

FIG. 9 illustrates a structure of a channel-voltage serial digital signal having a module signal according to an exemplary embodiment of the present invention.

Referring to FIG. 9, a channel-voltage serial digital signal 600 having a module signal has a channel-voltage digital signal 610 output from the 16-bit ADC 182, a channel selection digital signal 630 that is a 4-bit 16:1 analog switch operation signal, and a 4-bit module signal 650 output from the module identifier 185. The 4-bit module signal 650 output from the module identifier 185 is used to add a channel-voltage transmission module. Using a maximum of 16 modules, the number of channels can be increased to 256. For example, in a system for acquiring data of 32 channel signals, a maximum of 8 modules can be used to increase the number of channels to 256.

An elapsed time of a 24-bit channel-voltage serial digital signal 600 corresponding to one channel is equal to or slightly longer than a conversion time Tcon of the ADC 182, and a period Tck of a clock is as shown in Equation 4 below.

$$Tck=Tcon/24 \qquad \text{<Equation 4>}$$

When the output resolution of the ADC 182 is N bits, a channel-voltage serial digital signal has (8+N) bits, and the period Tck of the clock is as shown in Equation 5 below.

$$Tck=Tcon/(8+N) \qquad \text{<Equation 5>}$$

When the conversion time of the ADC 182 is Tcon, the channel-voltage transmission module 180 converts the same channel after every 16 Tcon, and thus a sampling time is 1/16 Tcon. When the conversion time Tcon of the ADC 182 is 2 μs, the sampling time is 31.3 kS/s.

Figure 10:
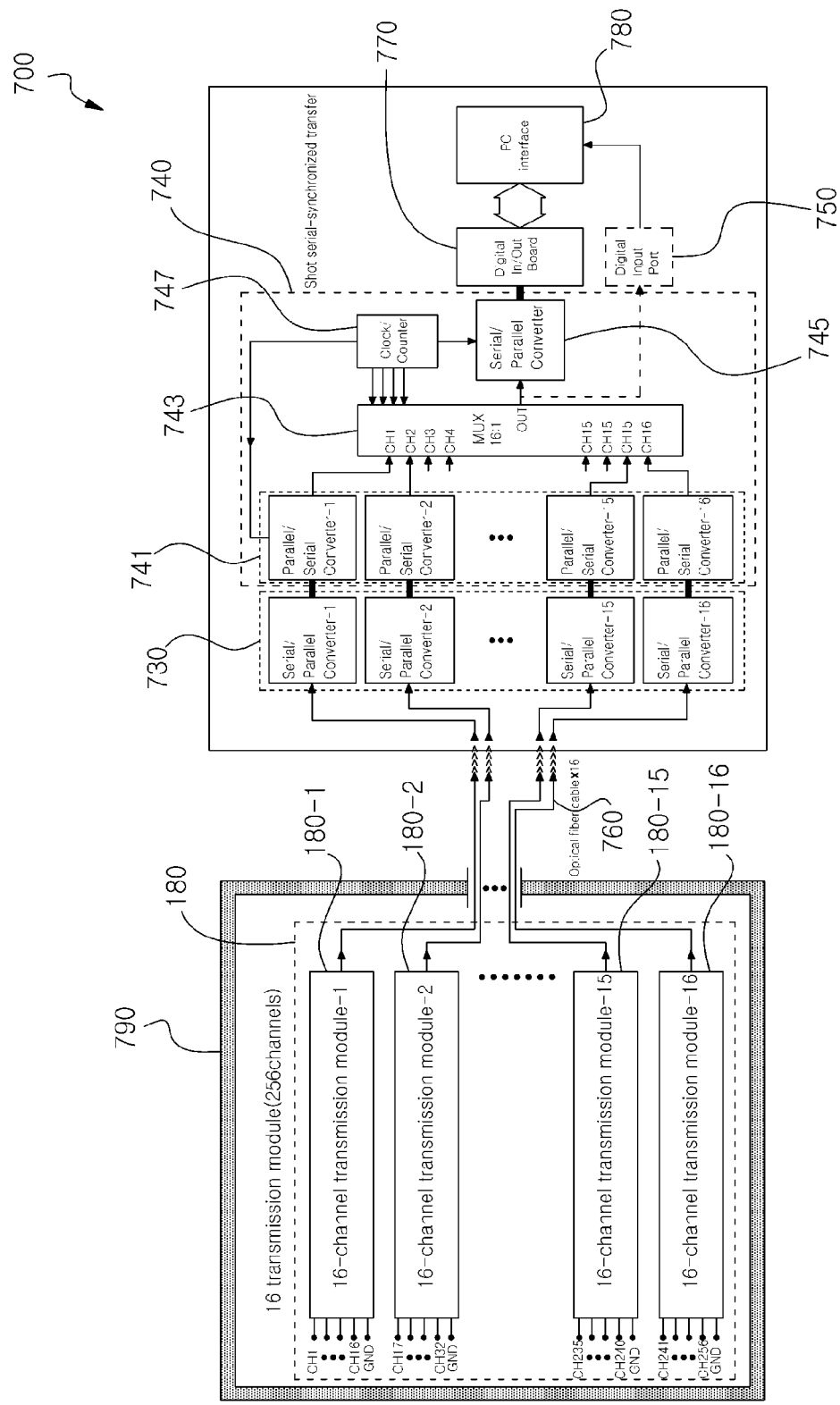
FIG. 10 is a block diagram of a system for acquiring 256-channel data using 16 channel-voltage transmission modules according to an exemplary embodiment of the present invention.

FIG. 10 is a block diagram of a system for acquiring 256-channel data using 16 channel-voltage transmission modules according to an exemplary embodiment of the present invention.

Referring to FIG. 10, a system 700 for acquiring data of 256-channel data includes a 16 channel-voltage transmission module unit 180, a serial-to-parallel conversion module unit 730, a shot serial-synchronized transfer module 740, a DIO board 770, and a data storage module 780.

16 channel-voltage transmission modules 180-1 to 180-16 are the same as the channel-voltage transmission module 180 of FIG. 8. Although not shown in the drawing, a module identifier identifies each module.

The channel-voltage transmission module unit 180 can be disposed in a shield room 790 as shown in the drawing. The respective channel-voltage transmission modules 180-1 to 180-16 of the channel-voltage transmission module unit 180 convert voltage signals measured in the shield room 790 and output from 16 channels into channel-voltage serial digital signals and transmit them to the outside of the shield room 790 through optical fiber cables 760.

The optical fiber cables 760 can have the same number as the 16 channel-voltage transmission modules 180-1 to 180-16. Through the optical fiber cables 760, the serial digital signals are transmitted out of the shield room 790 to the serial-to-parallel conversion module unit 730. The serial-to-parallel conversion module unit 730 includes a plurality of serial-to-parallel conversion modules that rearrange the input serial digital signals to convert them into parallel digital signals, and sends the parallel digitals signal to the shot serial-synchronized transfer module 740.

Figure 11:
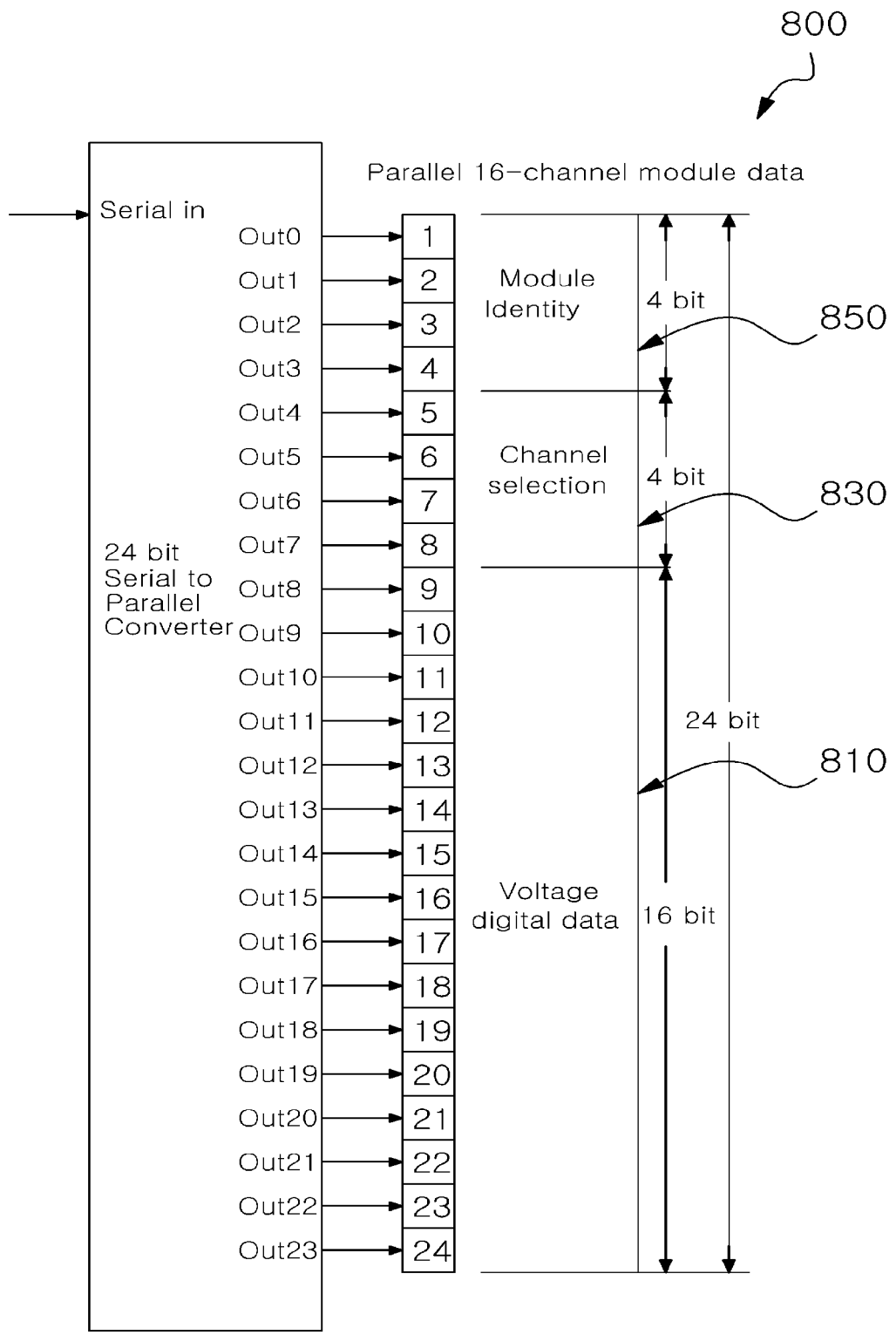
FIG. 11 illustrates a structure of a signal input to a shot serial-synchronized transfer module according to an exemplary embodiment of the present invention.

FIG. 11 illustrates a structure of a signal input to a shot serial-synchronized transfer module according to an exemplary embodiment of the present invention.

Referring to FIG. 11, in a signal 800 input to a shot serial-synchronized transfer module, a channel-voltage digital signal 810 output from a 16-bit ADC, a channel selection digital signal 830 that is a 4-bit 16:1 analog switch operation signal, and a 4-bit module signal 850 output from a module identifier are arranged in parallel. A digital signal transmitted from each channel-voltage transmission module is maintained at the output of a serial-to-parallel conversion module for a time of Tcon, and replaced by a digital signal of the next channel without being synchronized with the output of another serial-to-parallel conversion module.

Figure 12:
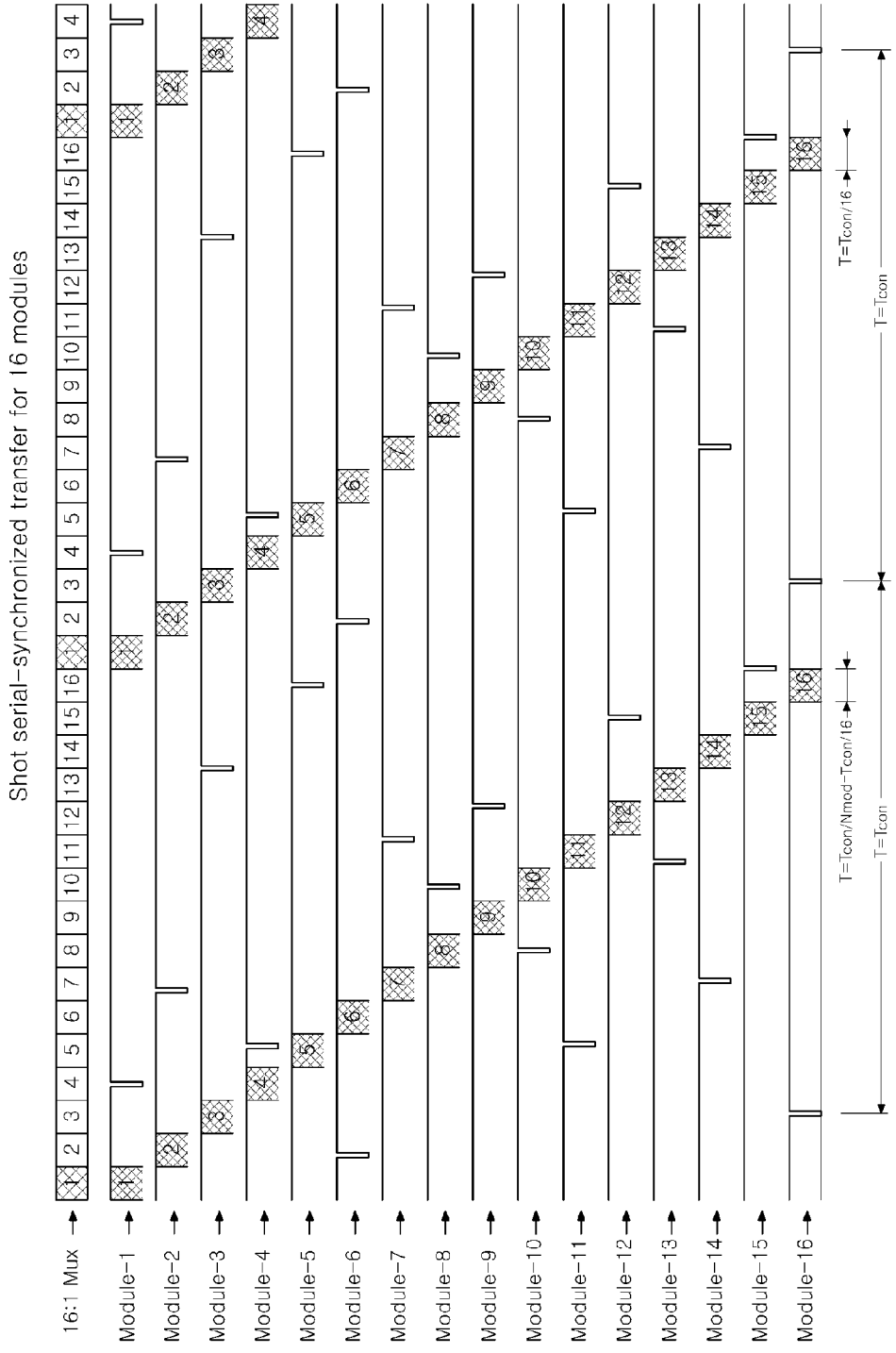
FIG. 12 illustrates time division of 16 modules for synchronization in a shot serial-synchronized transfer module according to an exemplary embodiment of the present invention.

FIG. 12 illustrates time division of 16 modules for synchronization in a shot serial-synchronized transfer module according to an exemplary embodiment of the present invention.

Referring to FIG. 12, a duration Tcon of a parallel digital signal is compared with those of other modules. Channel-voltage digital signals of respective modules that a 16:1 multiplexer (MUX) outputs for a time of Tcom/Nmod are shown in sequence.

Referring back to FIG. 10, the shot serial-synchronized transfer module 740 synchronizes a parallel digital signal of a plurality of modules with a digital signal without requiring complicated connection of wires and sends the synchronized digital signal to the DIO board 770, and includes a parallel-to-serial converter 741, a MUX 743, a serial-to-parallel converter 745, and a clock/counter 747.

The parallel-to-serial converter 741 reads a channel-voltage parallel digital signal of each module for a time of Tcon/Nmod, converts it into a serial digital signal, and sends the serial digital signal to the Nmod:1 MUX 743. Here, Tcon is a time in which the output of a serial-to-parallel converter is maintained, or the conversion time of an ADC, and Nmod is the number of modules. When 16 modules are employed, information about one channel is read for a time of Tcon/16.

The parallel-to-serial converter 741 reads the same data Nmod times for a time of Tcon, but the Nmod:1 MUX 743 outputs the data only once. When the parallel-to-serial converter 741 reads a channel-voltage parallel digital signal while the channel-voltage parallel digital signal is changed, a distorted signal may be obtained. To prevent this, a delayer can be disposed ahead of the serial-to-parallel converter 730. The clock/counter 747 outputs an Nmod:1 MUX selection signal and a synchronization clock.

Figure 13:
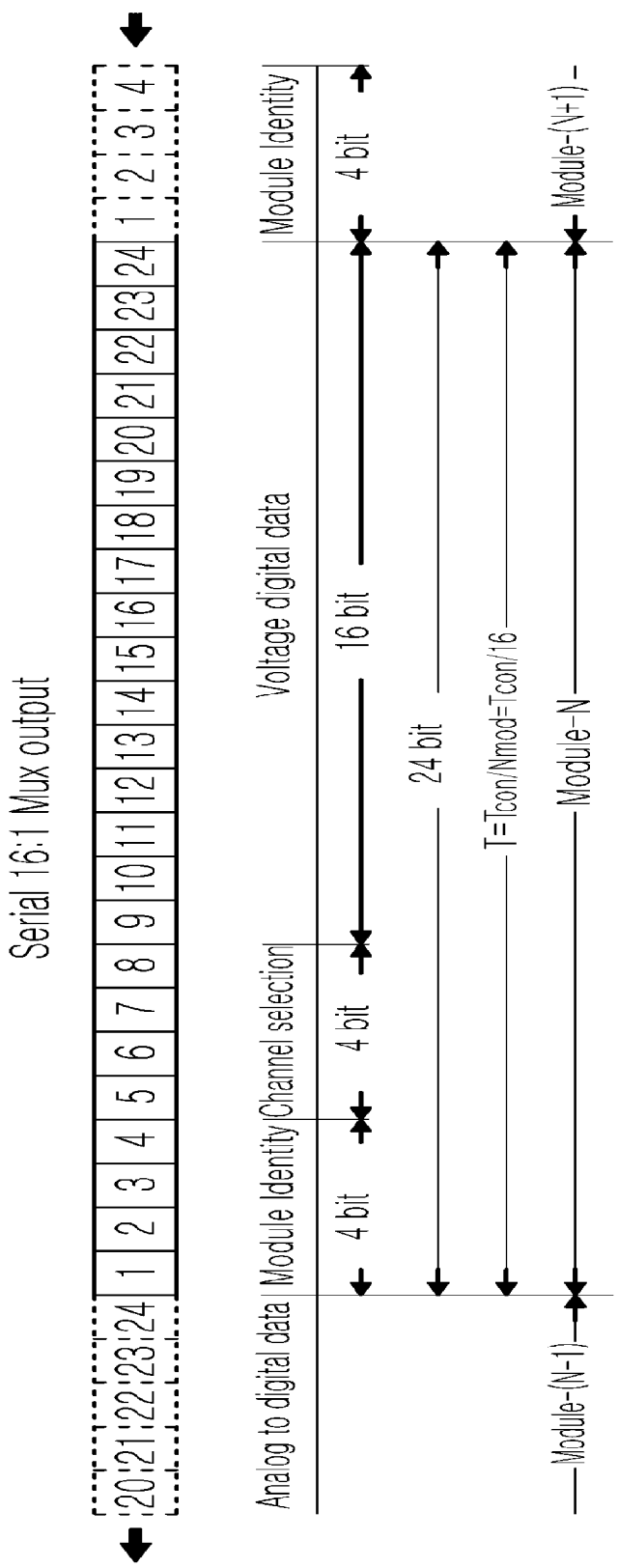
FIG. 13 illustrates a structure of a channel-voltage serial digital signal output from a 16:1 multiplexer (MUX) according to an exemplary embodiment of the present invention.

FIG. 13 illustrates a structure of a channel-voltage serial digital signal output from a 16:1 MUX according to an exemplary embodiment of the present invention.

Referring to FIG. 13, a 24-bit digital signal is output for a time of Tcon/Nmod=Tcon/16. A digital signal of the same module is output after a time of Tcon, and a channel-voltage digital signal of the same channel is output after a time of 16 Tcon. When 256 channel voltages are sampled using 16 modules, a sampling time is 1/16 Tcon. Here, when Tcon=2 μs, a sampling time is 31.3 kS/s. The sampling time of a 256 channel data acquisition system is 31.3 kS/s, which is the same as that of a 16 channel data acquisition system. Although the number of channels to be measured increases, the sampling time does not vary. An Nmod:1 MUX sequentially sends channel-voltage digital signals of module-1 to module-Nmod in series. A time of 16 Tcon is required to output all signals from 256 channels. In other words, when Tcon=2 μs, a required time is 32 μs.

Referring back to FIG. 10, an output of the Nmod:1 MUX 743 is sent to the serial-to-parallel converter 745. The serial-to-parallel converter 745 receives the output of the Nmod:1 MUX 743 and outputs a 24-bit channel-voltage parallel digital signal. The DIO board 770 receives and sends the 24-bit channel-voltage parallel digital signal to the data storage module 780. The data storage module 780 receives the 24-bit channel-voltage parallel digital signal to store it or output information about a channel and voltage using application software.

In the serial-to-parallel converter 745, a parallel output of each channel is as shown in FIG. 11, but a duration is reduced to a time of Tcon/Nmod. A 24-bit DIO board should read outputs once or more for a time of Tcon/Nmod, and thus reads an output for a time of less than Tcon/Nmod=2 μs/16=0.125 μs or at 8 MHz when Nmod=16, that is, an ADC has Tcon=2 μs in a 256-channel system.

A 256-channel data acquisition system may include a digital input device 750, which can receive a channel-voltage serial digital signal output from an Nmod:1 MUX and transmit it directly to a data storage module.

Figure 14:
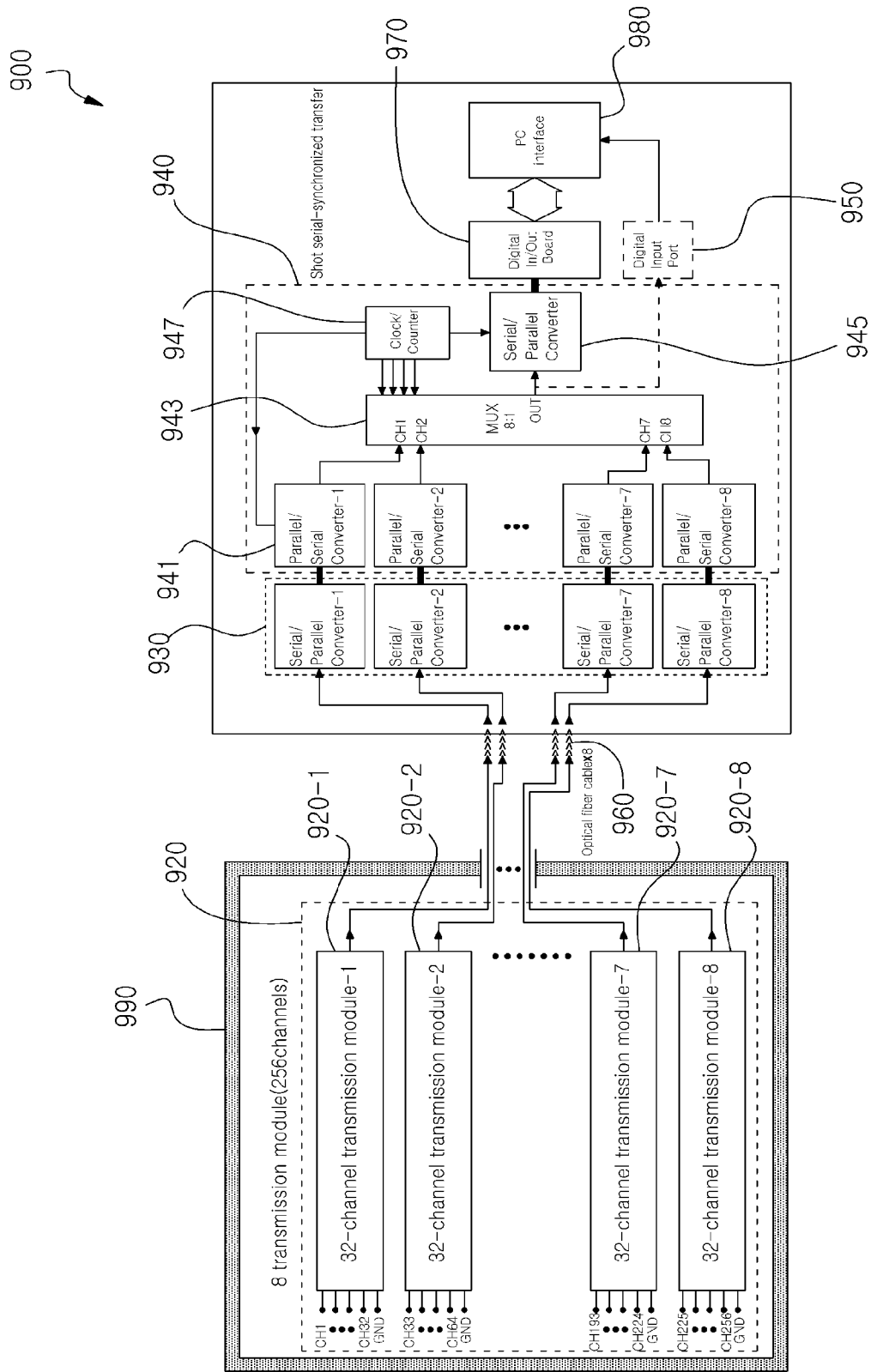
FIG. 14 is a block diagram of a system for acquiring 256-channel data using 32 channel-voltage transmission modules according to an exemplary embodiment of the present invention.

FIG. 14 is a block diagram of a system for acquiring 256-channel data using 32 channel-voltage transmission modules according to an exemplary embodiment of the present invention.

Referring to FIG. 14, a system 900 for acquiring 256-channel data includes a 32 channel-voltage transmission module unit 920, a serial-to-parallel conversion module unit 930, a shot serial-synchronized transfer module 940, a DIO board 970, and a data storage module 980.

The constitution of each module in the system 900 is similar to that of FIG. 10. Although a 32-channel voltage transmission module is not shown in the drawing, a module identifier in the 32-channel voltage transmission module identifies respective modules.

Respective channel-voltage transmission modules 920-1 to 920-8 of the channel-voltage transmission module unit 920 convert voltage signals measured in a shield room 990 and output from 32 channels into channel-voltage serial digital signals, and transmit the channel-voltage serial digital signals to the outside of the shield room 990 through optical fiber cables 960.

The optical fiber cables 960 can have the same number as the modules 920-1 to 920-8 of the 32 channel-voltage transmission module unit 920. Through the optical fiber cables 960, the serial digital signals are transmitted out of the shield room 990 to the serial-to-parallel conversion module unit 930. The serial-to-parallel conversion module unit 930 includes a plurality of serial-to-parallel conversion modules that rearrange the input serial digital signals to convert them into parallel digital signals.

The parallel digital signals output from the serial-to-parallel conversion module unit 930 are sent to the shot serial-synchronized transfer module 940. The shot serial-synchronized transfer module 940 synchronizes a parallel digital signal of a plurality of modules with a digital signal without requiring complicated connection of wires and sends the synchronized digital signal to the DIO board 970, and includes a parallel-to-serial converter 941, a MUX 943, a serial-to-parallel converter 945, and a clock/counter 947.

The parallel-to-serial converter 941 reads a channel-voltage parallel digital signal of each module for a time of Tcon/Nmod, converts it into a serial digital signal, and sends the serial digital signal to the Nmod:1 MUX 943. When 8 modules are employed, information about one channel is read for a time of Tcon/8.

Figure 15:
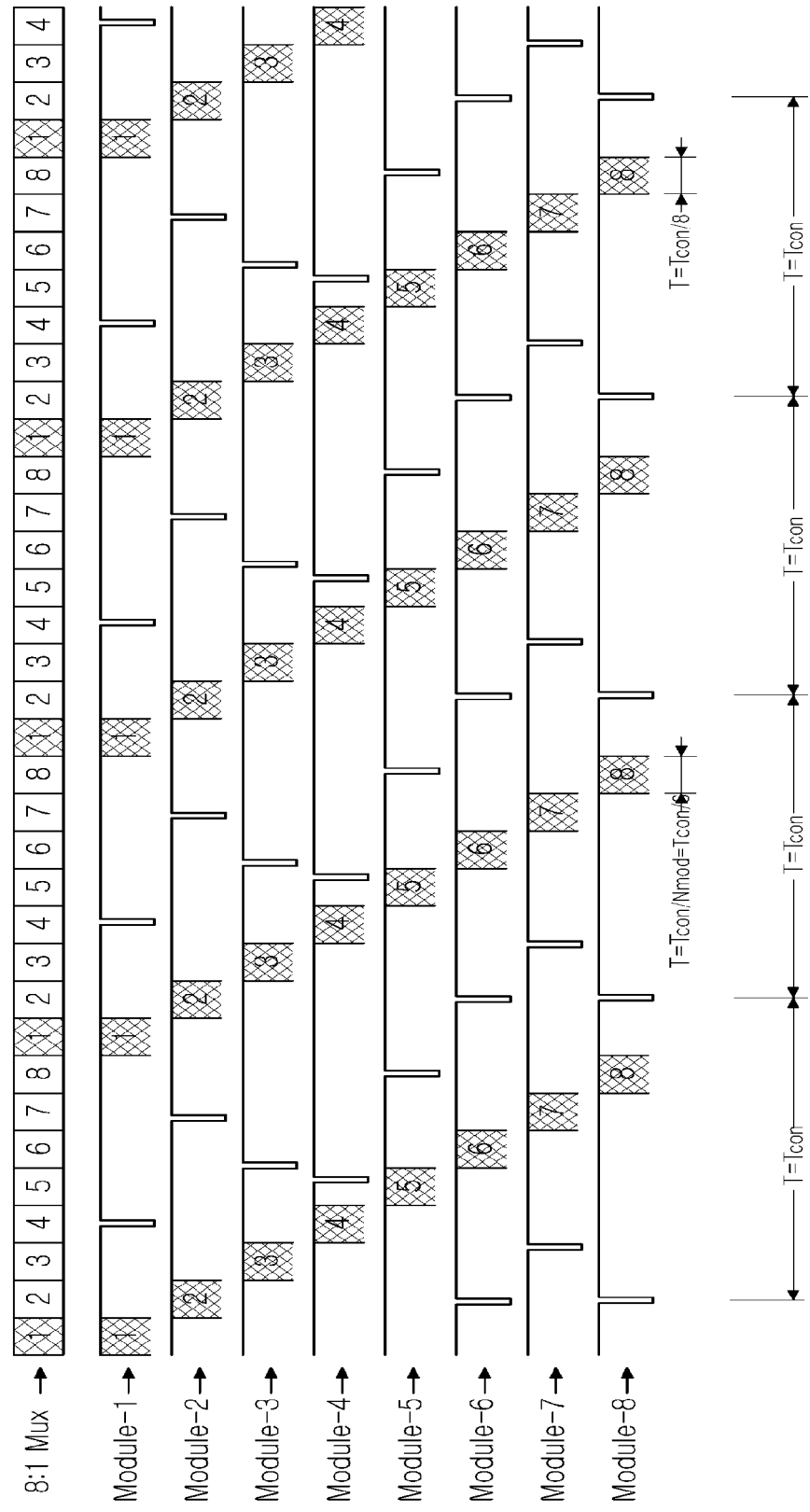
FIG. 15 illustrates time division of 8 modules for synchronization in a shot serial-synchronized transfer module according to an exemplary embodiment of the present invention.

FIG. 15 illustrates time division of 8 modules for synchronization in a shot serial-synchronized transfer module according to an exemplary embodiment of the present invention.

Referring to FIG. 15, a duration Tcon of a parallel digital signal is compared with those of other modules. Channel-voltage digital signals of respective modules that an 8:1 MUX outputs for a time of Tcom/Nmod are shown in sequence.

Figure 16:
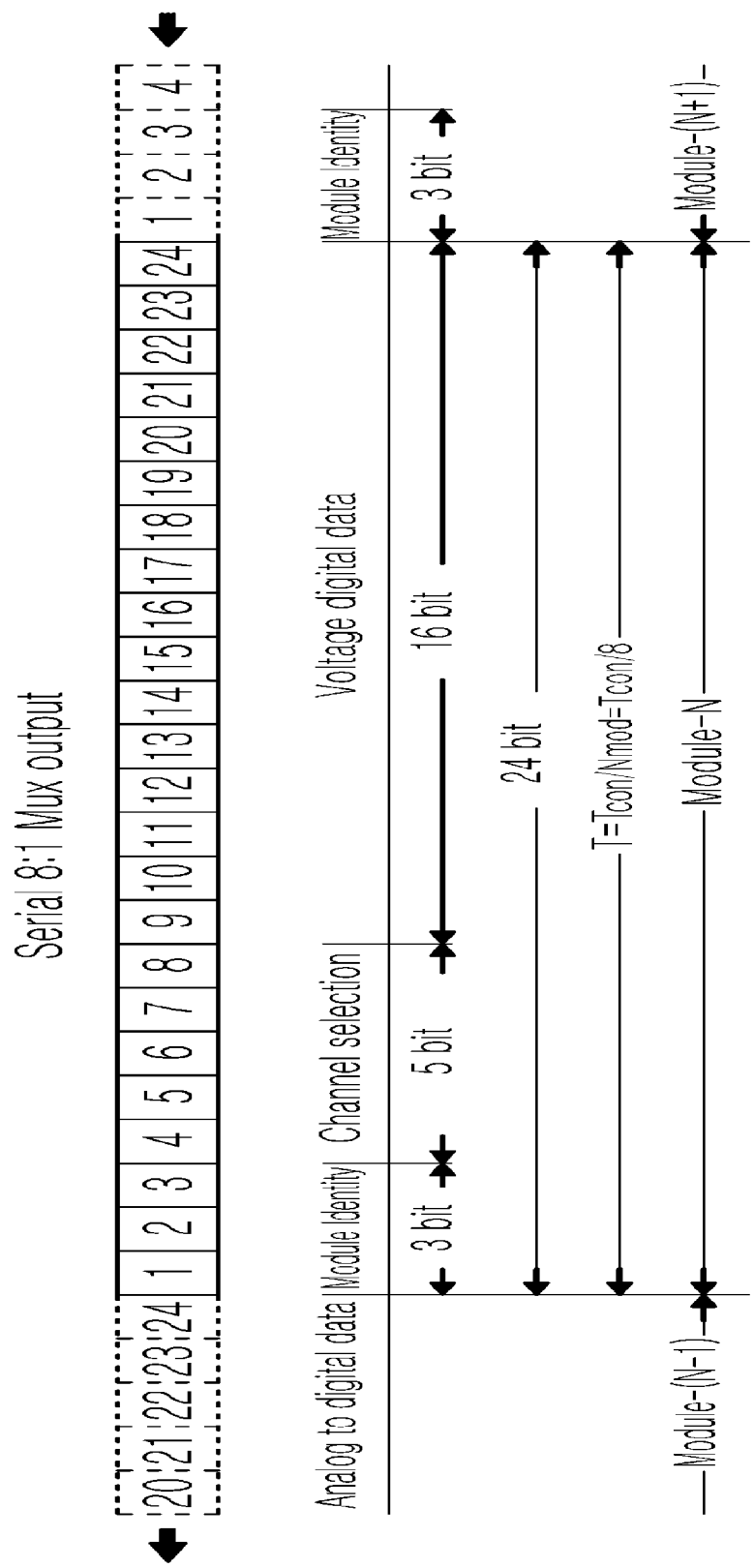
FIG. 16 illustrates a structure of a channel-voltage serial digital signal output from an 8:1 MUX according to an exemplary embodiment of the present invention.

FIG. 16 illustrates a structure of a channel-voltage serial digital signal output from an 8:1 MUX according to an exemplary embodiment of the present invention.

Referring to FIG. 16, a 24-bit digital signal is output for a time of Tcon/Nmod=Tcon/8. A digital signal of the same module is output after a time of Tcon, and a channel-voltage digital signal of the same channel is output after a time of 32 Tcon. When 256 channel voltages are sampled using 8 modules, a sampling time is 1/32 Tcon. Here, when Tcon=2 μs, a sampling time is 15.6 kS/s. The sampling time of a 256 channel data acquisition system is 15.6 kS/s, which is the same as that of a 32 channel data acquisition system. Although the number of channels increases, the sampling time does not vary. An Nmod:1 MUX sequentially sends channel-voltage digital signals of module-1 to module-Nmod in series. A time of 32 Tcon is required to output all signals from 256 channels. In other words, when Tcon=2 μs, a required time is 64 μs.

Referring back to FIG. 14, an output of the Nmod:1 MUX 943 is sent to the serial-to-parallel converter 945. The serialto-parallel converter 945 receives the output of the Nmod:1 MUX 943 and outputs a 24-bit channel-voltage parallel digital signal. The DIO board 970 receives and sends the 24-bit channel-voltage parallel digital signal to the data storage module 980. The data storage module 980 receives the 24-bit channel-voltage parallel digital signal to store it or output information about a channel and voltage using application software.

A 256-channel data acquisition system may include a digital input device 950, which can receive a channel-voltage serial digital signal output from the Nmod:1 MUX 943 and transmit it directly to the data storage module 980.

In the exemplary embodiments, the above-described modules are separately implemented. However, some of the modules may be separately implemented as several modules, or implemented as one integrated module.

Detailed values used above are merely intended to describe an exemplary embodiment of the present invention, and the present invention is not limited to these values.

All the above-described functions can be performed by processors, such as a microprocessor, a controller, a microcontroller, and an application-specific integrated circuit (ASIC), based on software, a program code, etc. coded to perform these functions. Design, development, and implementation of the code are apparent to those of ordinary skill in the art on the basis of the description of the present invention.

The above-described system and method for acquiring data of a multi-channel signal according to an exemplary embodiment of the present invention do not cause inflow of external noise resulting from connection between a plurality of wires, and thus correct data can be acquired. A signal measured through multiple channels can be transmitted to a computer over a long distance at high speed without distortion and then processed. Even when a channel through which a signal is measured is added, sampling time is not reduced, and additional production cost caused by the added channel can be significantly reduced. Since the system has a simple constitution and can be manufactured together with a sensor detection circuit, an installation area decreases.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A system for acquiring data of a multi-channel signal, comprising:
   a channel-voltage transmission module disposed in a shield room blocking electromagnetic waves, connected with a plurality of channels from which analog signals are output, and configured to generate a serial digital signal having information about the analog signals and information about the channels from which the analog signals are output; and
   an optical fiber cable through which the serial digital signal is transmitted from the channel-voltage transmission module to the outside of the shield room;
   wherein the channel-voltage transmission module includes:
   an analog switch configured to select an analog signal output of a selected channel from the analog signals output from the plurality of channels;
   an analog-to-digital converter (ADC) configured to convert the selected analog signal into a serial digital signal;
   a clock/counter configured to generate a channel selection digital signal for the analog switch to select a channel; and
   a parallel-to-serial converter configured to convert the channel selection digital signal into a serial channel selection digital signal and combine the serial channel selection digital signal with the serial digital signal to generate a serial digital signal having information about the analog signal and information about the channel from which the analog signal is output.

2. The system of claim 1, wherein the information about the analog signals is voltage values output from the plurality of channels.

3. The system of claim 1, wherein, when the analog switch is connected to 16 channels, the ADC converts an analog signal output from one channel into a 16-bit serial digital signal,
   the clock/counter generates a 4-bit channel selection digital signal, and
   the parallel-to-serial converter generates a 20-bit serial digital signal.

4. The system of claim 1, wherein, when the analog switch is connected to 32 channels, the ADC converts an analog signal output from one channel into a 16-bit serial digital signal,
   the clock/counter generates a 5-bit channel selection digital signal, and
   the parallel-to-serial converter generates a 21-bit serial digital signal.

5. The system of claim 1, further comprising a serial-to-parallel conversion module configured to convert the serial digital signal transmitted through the optical fiber cable into a parallel digital signal.

6. The system of claim 5, further comprising a data storage module configured to store the parallel digital signal or generate the information about the analog signals and the information about the channels from which the analog signals are output.

7. A system for acquiring data of a multi-channel signal, comprising:
   a channel-voltage transmission module unit disposed in a shield room blocking electromagnetic waves, connected with a plurality of channels from which analog signals are output, and including a plurality of channel-voltage transmission modules generating, from the analog signals output through the plurality of channels, serial digital signals having information about the analog signals and information about the channels from which the analog signals are output; and
   as many optical fiber cables as the channel-voltage transmission modules, the optical fiber cables transmitting the serial digital signals from the channel-voltage transmission module unit to the outside of the shield room;
   wherein:
   the channel-voltage transmission modules include:
   an analog switch configured to select an analog signal output of a selected channel from among the analog signals output from the plurality of channels;
   an analog-to-digital converter (ADC) configured to convert the selected analog signal into a serial digital signal;
   a clock/counter configured to generate a channel selection digital signal for the analog switch to select a channel;
   a parallel-to-serial converter configured to convert the channel selection digital signal into a serial channel selection digital signal and combine the serial channel selection digital signal with the serial digital signal to generate a serial digital signal having information about the analog signal and information about the channel from which the analog signal is output; and a module identifier configured to output a serial digital signal for identifying the channel-voltage transmission modules.

8. The system of claim 7, wherein the information about the analog signals is voltage values output from the plurality of channels.

9. The system of claim 7, wherein, when the analog switch is connected to 16 channels, the ADC converts an analog signal output from one channel into a 16-bit serial digital signal, the clock/counter generates a 4-bit channel selection digital signal, the module identifier generates a 4-bit serial digital signal for identifying the channel-voltage transmission modules, and the parallel-to-serial converter generates a 24-bit serial digital signal.

10. The system of claim 7, wherein, when the analog switch is connected to 32 channels, the ADC converts an analog signal output from one channel into a 16-bit serial digital signal, the clock/counter generates a 5-bit channel selection digital signal, the module identifier generates a 3-bit serial digital signal for identifying the channel-voltage transmission modules, and the parallel-to-serial converter generates a 24-bit serial digital signal.

11. The system of claim 7, further comprising a serial-to-parallel conversion module unit including a plurality of serial-to-parallel conversion modules having the same number as the channel-voltage transmission modules and converting the serial digital signals transmitted through the optical fiber cables into parallel digital signals.

12. A method of acquiring data of a multi-channel signal, comprising:

generating, from analog signals output from a plurality of channels, a serial digital signal having information about the analog signals and information about the channels from which the analog signals are output in a shield room blocking electromagnetic waves; and transmitting the serial digital signal to the outside of the shield room using an optical fiber cable;

wherein generating includes:

selecting an analog signal output of a selected channel from the analog signals output from the plurality of channels;

converting the selected analog signal into a serial digital signal;

generating a channel selection digital signal for the analog switch to select a channel; and converting the channel selection digital signal into a serial channel selection digital signal and combine the serial channel selection digital signal with the serial digital signal to generate a serial digital signal having information about the analog signal and information about the channel from which the analog signal is output.

13. The method of claim 12, wherein the information about the analog signals is voltage values output from the plurality of channels.

14. The method of claim 12, further comprising converting the serial digital signal transmitted to the outside of the shield room using the optical fiber cable into a parallel digital signal.

15. The method of claim 14, further comprising storing the parallel digital signal or outputting the information about the analog signals and the information about the channels from which the analog signals are output from the parallel digital signal.

* * * * *